(12) United States Patent
Hedtke

(10) Patent No.: US 7,430,917 B2
(45) Date of Patent: Oct. 7, 2008

(54) PROCESS TRANSMITTER WITH SELF SEALING FILL FLUID SYSTEM

(75) Inventor: Robert Hedtke, Young American, MN (US)

(73) Assignee: Rosemount Inc., Eden Prairie, MN (US)

( * ) Notice: Subject to any disclaimer, the term of this patent is extended or adjusted under 35 U.S.C. 154(b) by 271 days.

(21) Appl. No.: 11/401,020

(22) Filed: Apr. 10, 2006

(65) Prior Publication Data

US 2007/0234813 A1 Oct. 11, 2007

(51) Int. Cl.
*G01L 7/00* (2006.01)
(52) U.S. Cl. .................................................. 73/706
(58) Field of Classification Search .............. 73/716, 73/718, 706
See application file for complete search history.

(56) References Cited

U.S. PATENT DOCUMENTS

| | | | |
|---|---|---|---|
| 3,692,549 A | 9/1972 | Martin | |
| 6,038,961 A * | 3/2000 | Filippi et al. ................. | 92/98 R |
| 6,120,033 A * | 9/2000 | Filippi et al. ................. | 277/315 |
| 6,675,655 B2 * | 1/2004 | Broden et al. ................. | 73/716 |
| 6,767,395 B2 | 7/2004 | Erick | |
| 6,786,960 B2 | 9/2004 | Profetto | |
| 7,036,381 B2 * | 5/2006 | Broden et al. ................. | 73/708 |
| 7,258,021 B2 * | 8/2007 | Broden ........................ | 73/756 |
| 7,290,452 B2 * | 11/2007 | Hedtke ........................ | 73/706 |
| 7,373,831 B2 * | 5/2008 | Broden et al. ................. | 73/715 |
| 2003/0177837 A1 * | 9/2003 | Broden et al. ................. | 73/716 |

OTHER PUBLICATIONS

Webpage, "D3147-94(1999) Standard Test Method for Testing Stop-Leak Additives for Engine Coolants", http://www.astm.org/cgi-bin/SoftCart.exe/DATABASE.CART/REDLINE_PAGES/D3147.htm?E+mystore, 1 page, Sep. 12, 2005.
Webpage, "Radiator Additives", http://www.justicebrothers.com/pages/products/products_carcare_radiator_additives.html, 2 pages, Sep. 12, 2005.
Product information sheets "Dow Corning ® 200 Fluid 1 cst", 4 pages, Jul. 23, 2001.
Webpage, Stephan Companies, http://www.stepan.com/en/products/product_detail.asp?id=327, 1 page, Sep. 12, 2005.
Webpage, The Dow Chemical Company, "Dow Heat Transfer Fluids: The Full Family of Dow Fluids: Syltherm HF", http://www.dow.com/heattrans/family/sylhf/, 2 pages, Sep. 12, 2005.
Webpage, Wynn Oil Company, "Cooling Service Products", http://www.wynnsusa.com/cooling.asp, 5 pages, Sep. 6, 2005.

* cited by examiner

*Primary Examiner*—Andre J Allen
(74) *Attorney, Agent, or Firm*—Kinney & Lange, P.A.

(57) ABSTRACT

A process transmitter includes a hydraulic system with a fill fluid for transmitting pressure from a process fluid to a pressure sensor. The fill fluid contains hydraulic fluid and a self-activating stop-leak composition for preventing loss of fill fluid caused by leaks in the hydraulic system.

5 Claims, 2 Drawing Sheets

PROCESS TRANSMITTER WITH SELF SEALING FILL FLUID SYSTEM

BACKGROUND OF THE INVENTION

This invention relates generally to process instruments used in industrial process control systems. More particularly, the present invention relates to self-sealing hydraulic systems for use in process transmitters.

Process transmitters are used to monitor process variables, such as pressure, temperature, flow and level of process fluids used in a variety of industrial processes. For example, process transmitters are widely used in the chemical manufacturing and oil refining industries to measure variables of process fluids situated throughout production facilities. Process transmitters are typically employed throughout manufacturing or processing facilities at multiple locations to monitor a variety of process variables.

Process transmitters include sensors that produce an electrical output in response to physical changes in the process variable. For example, capacitive pressure transducers or piezoresistive pressure transducers produce an electrical output as a function of the pressure of a process fluid. Typically, the pressure of the process fluid is transmitted to the sensor through a closed hydraulic system that is in contact with the process fluid at one end and the sensor at another end. As the pressure is sensed, the electrical output of the sensor is processed by the transmitter's circuitry so it can be monitored as an indication of the process variable magnitude.

The accuracy of the process transmitter depends on the ability of the closed hydraulic system to convey the magnitude of the process fluid pressure to the sensor. Typically, the hydraulic system is comprised of a hydraulic passageway that is filled with a precise level of fill fluid. At a first end of the hydraulic passageway is an isolation diaphragm that separates the fill fluid from the process fluid. At a second end of the hydraulic passageway is a sensor diaphragm that links the sensor with the fill fluid. The fill fluid typically comprises a hydraulic fluid that conveys the process fluid pressure from the isolation diaphragm to the sensor diaphragm. In other embodiments, remote seals serve as extensions of the passageway and comprise a capillary tube having additional fill fluid. As the process fluid pressure fluctuates, the process fluid exerts a corresponding force on the isolation diaphragm at the first end of the hydraulic system. The fill fluid present in the hydraulic system transmits the force to the first end of the hydraulic passageway to the isolation diaphragm. At a second end of the hydraulic passageway is a sensor diaphragm that links the sensor with the fill fluid. The force deflects the sensor diaphragm, thereby causing the sensor to alter its electrical output. Thus, the electrical output is directly related to the hydraulic nature of the fill fluid. The accuracy of the process transmitter output is related to the quantity and quality of fill fluid in the passageway and remote seal of the hydraulic system. Small leaks can reduce the quantity of fill fluid, which can introduce several inaccuracies such as diaphragms bottoming out. Leaks also allow air to enter the system which can introduce inaccuracies because gas is compressible.

Due to harsh usage, corrosion, material variations, manufacturing variations, etc., the hydraulic systems of process transmitters can develop microscopic leaks. Over time these microscopic leaks can lead to reduced accuracy performance. Since the leaks are insubstantial, there is little physical evidence of the leaking fill fluid. There is also little initial evidence in the decline in performance of the process transmitter from such small leaks. Until a substantial amount of fill fluid has leaked from the hydraulic system such that the deficiency in the process transmitter's performance is readily apparent, inaccuracies in performance can go undetected. If not discovered, the microscopic leaks will ultimately lead to a complete inability of the hydraulic system to transmit the magnitude of the process variable to the sensor.

BRIEF SUMMARY OF THE INVENTION

The present invention is directed toward a process transmitter for measuring a process variable of a process fluid. The process transmitter includes a sensor, a hydraulic system and a fill fluid. The sensor measures the magnitude of a process fluid variable. The hydraulic system provides a communication channel between the process fluid and the sensor. The fill fluid comprises a hydraulic fluid and a stop-leak composition. The fill fluid transmits a change in the process variable of the process fluid to the sensor. The stop-leak composition is self-sealing and seals leaks in the hydraulic system.

DETAILED DESCRIPTION

Figure 1:
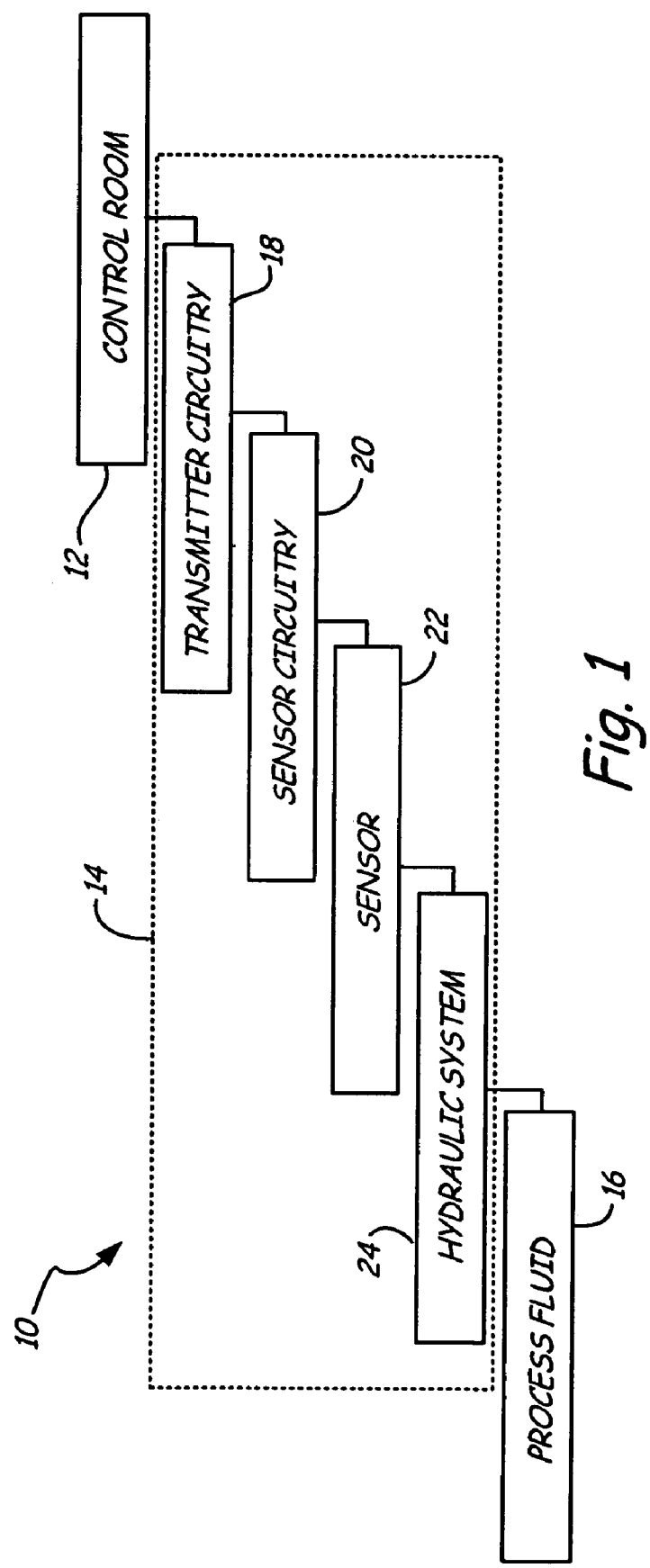
FIG. 1 shows a block diagram of a process control system in which the process transmitter of the present invention is used.

FIG. 1 shows process control system 10, which includes control room 12, process transmitter 14 and process fluid 16. Process transmitter 14 is comprised of transmitter circuitry 18, sensor circuitry 20, sensor 22 and hydraulic system 24. Process transmitter 14 is used to monitor the level of a process variable, such as pressure, in process fluid 16.

Sensor 22 of process transmitter 14 is hydraulically connected with process fluid 16 through hydraulic system 24. Hydraulic system 24 includes a passageway that is coupled with process fluid 16 at a first end and sensor 22 at a second end. Hydraulic system 24 includes a first fill fluid that is comprised of a first hydraulic fluid and a first stop-leak composition. The first hydraulic fluid transmits the pressure of process fluid 16 to sensor 22. The first stop-leak composition seals leaks that develop in the passageway of hydraulic system 24.

In another embodiment, hydraulic system 24 includes a remote seal that allows the passageway of hydraulic system 24 to be extended beyond the confines of the housing of process transmitter 14. The remote seal includes a capillary charged with a second fill fluid, comprised of a second hydraulic fluid and a second stop-leak composition, that is isolated from the first fill fluid of the passageway.

The first hydraulic fluid and the second hydraulic fluid can be any suitable hydraulic fluid that is known in the art. In various embodiments, the first and second hydraulic fluids are comprised of DC 200, DC 704 ® or Syltherm XLT ® silicone oil as is commercially available from Dow Corning Corporation, Midland, Mich., USA. In other embodiments, similar fluids can be used such as Halocarbon ® from Halocarbon Products Corporation, River Edge, N.J., USA; Neobee ® M-200 from Stepan Company, Northfield, Ill., USA; glycerin and water or propylene glycol. The first hydraulic stop-leak composition and second stop-leak composition are described in greater detail with respect to FIG. 2. Both the first stop-leak composition and the second stop-leak composition are self-sealing. Upon the formation of a microscopic leak in either the passageway or remote seal, the self-sealing stop-leak compositions work to quickly seal the leak without any external activation. In one embodiment, the first and second fill fluids are comprised of a mix of hydraulic fluid to stop-leak composition in a ratio of about 100:1.

Sensor 22 senses a physical change in a process variable of process fluid 16 through hydraulic system 24. Typically, sensor 22 is a transducer that produces an electrical signal in response to a change in the pressure of process fluid 16 as presented through the first fill fluid. Sensor 22 is in electronic communication with sensor circuitry 20. Sensor circuitry 20 conditions the output of sensor 22 into a usable format whereby it is displayed for local monitoring and sent to transmitter circuitry 18. Transmitter circuitry 18 of process transmitter 14 is used to convey the output of sensor circuitry 20 to an outlying location for remote monitoring of the process variable at control room 12. In one embodiment, transmitter circuitry 14 is in communication with control room 12 through control loop 26. In other embodiments, transmitter circuitry 18 communicates over a wireless network. In still other embodiments, process transmitter 14 does not include transmitter circuitry 18 and is not connected with control room 12. In yet another embodiment, the conditioned output of sensor 22 is readable by a handheld device linked by wires or wirelessly with process transmitter 14.

Figure 2:
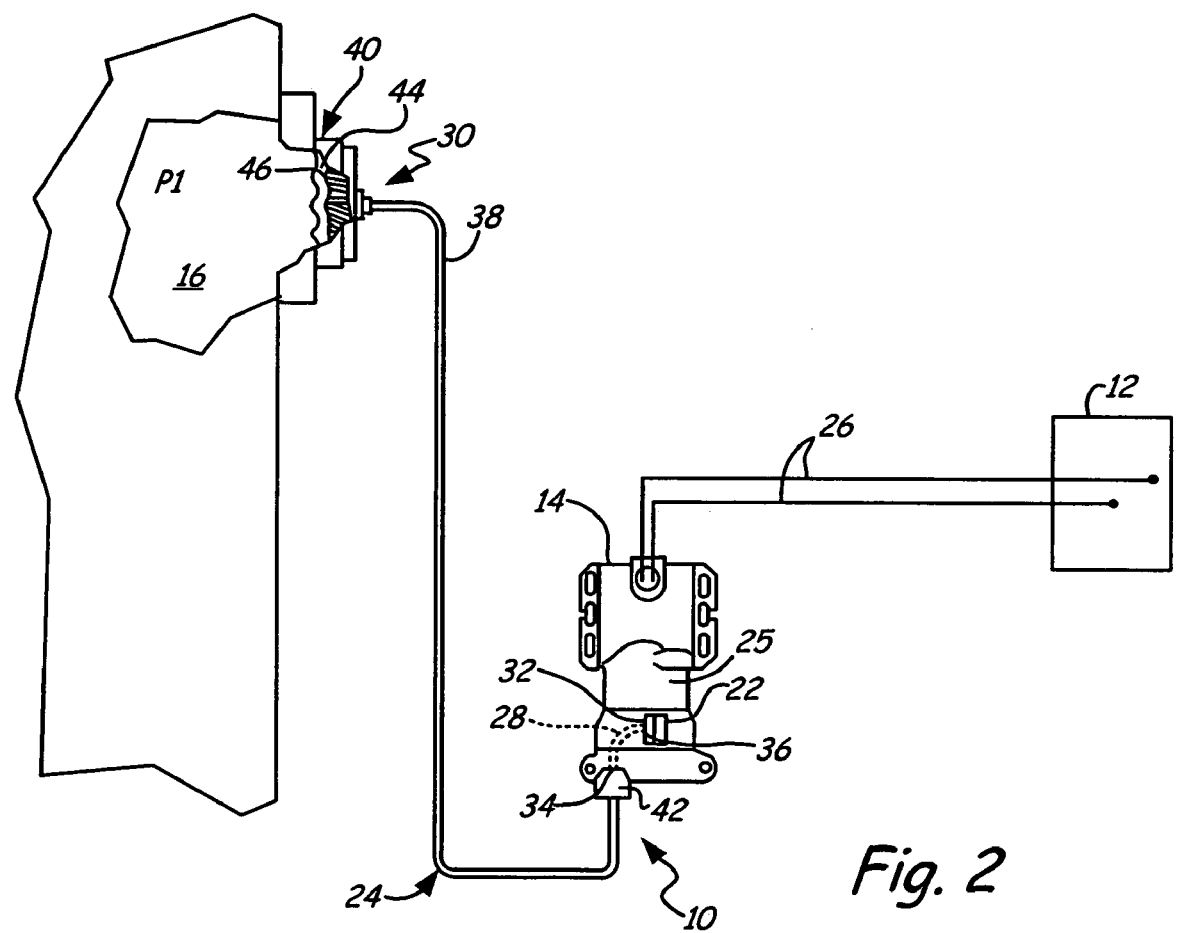
FIG. 2 shows a process transmitter having a remote seal in which the present invention is used.

FIG. 2 shows an embodiment of process control system 10 in which process transmitter 14 of the present invention is used. Process control system 10 includes control room 12, process transmitter 14 and process fluid 16. Process transmitter 14 is comprised of sensor 22, hydraulic system 24 and housing 25 and is connected to control room 12 by control loop 26. Hydraulic system 24 is comprised of passageway 28 and remote seal 30.

Passageway 28 extends between sensor diaphragm 32 and first isolation diaphragm 34 and is filled with first fill fluid 36. Remote seal 30 comprises capillary 38, isolator assembly 40, connector 42 and second isolation diaphragm 44 and is filled with second fill fluid 46. First fill fluid 36 comprises a first hydraulic fluid and a first stop-leak composition. Second fill fluid 46 comprises a second hydraulic fluid and a second stop-leak composition.

Process transmitter 14 is used to detect the pressure of process fluid 16. Process transmitter 14 is shown as an absolute pressure gauge having only one hydraulic system 24. In other embodiments, process transmitter 14 is fitted with a second hydraulic system so that differential pressure can be sensed. Process transmitter 14 generates an electrical signal based on the response of sensor 22 to the pressure applied by first fill fluid 36 to sensor diaphragm 32. First fill fluid 36 is influenced by the pressure of second fill fluid 46, applied to first isolation diaphragm 34. The pressure of second fill fluid 46 is responsive to the pressure applied process fluid 16 to second isolation diaphragm 44. Process transmitter 14 relays the electrical signal to control room 12 utilizing control loop 26. The magnitude of the electrical signal is based on the pressure of process fluid 16 detected by sensor 20, as presented through fill fluids 36 and 46 of hydraulic system 24. The magnitude of the electrical signal is monitored at control room 12 as an indication of the magnitude of the process pressure of process fluid 16. Control room 12 also supplies power to process transmitter 14 and communicates with process transmitter 14 over control loop 26.

Isolation diaphragm 44 segregates process fluid 16 from second fill fluid 46 used in remote seal 30. Process fluid 16 has an associated pressure P1 that exerts a force on isolation diaphragm 44. The force is transmitted from isolation diaphragm 44 by second fill fluid 46 of capillary 38 to first isolation diaphragm 34 of passageway 28, such that the pressure in capillary 38 equals pressure P1. The force associated with P1 is transmitted from first isolation diaphragm 34 to sensor diaphragm 32 and sensor 22 by first fill fluid 36, such that the pressure in passageway 28 equals pressure P1.

The amount of force that is transmitted to sensor 22 depends on the quality and quantity of first hydraulic fluid and second hydraulic fluid present in hydraulic system 24. Process transmitter 14 is calibrated having a fixed amount of first and second hydraulic fluids present in hydraulic system 24. In the event any hydraulic fluid leaks out of hydraulic system 24, the accuracy of process transmitter 14 is reduced, and an inaccurate output is produced by sensor 22.

To minimize the affect of microscopic leaks, first fill fluid 36 and second fill fluid 46 contain first and second self-activating stop-leak compositions, respectively. Passageway 28 is filled with first fill fluid 36 comprising the first hydraulic fluid and the first stop-leak composition. Capillary 38 is filled with second fill fluid 46 comprising the second hydraulic fluid and the second stop-leak composition. The two fill fluids are separated by first isolation diaphragm 42. The stop-leak compositions seal microscopic leaks that form in hydraulic system 24, and in turn maintain a higher accuracy in process transmitter 14.

Since passageway 28 comes into contact with sensor diaphragm 32 it is not feasible to use metallic based stop-leak compositions as the first stop-leak composition. Metallic based stop-leak compositions could interfere with the electrical output generated by the capacitive or piezoresistive transducer of sensor 22. For example, metallic based stop-leak compositions could affect the capacitance between capacitor plates of capacitive transducers.

In one embodiment, the first stop-leak composition is a non-metallic based stop-leak composition. Particularly, in one embodiment, the first stop-leak composition is polymer based. Preferably, the first stop-leak composition is a long-chain polymer based composition such as a polytetrafluoroethylene (e.g. Teflon ®) based composition.

The second stop-leak composition seals microscopic leaks that form in capillary 38. The second stop-leak composition prevents microscopic leaks from slowly bleeding capillary 38 of second fill fluid 46. Second fill fluid 46 is isolated from process fluid 16, sensor 22 and the circuitry of process transmitter 14. Therefore, second fill fluid 46 can include a metallic based stop-leak composition as is readily known in the art. In one embodiment, second stop-leak composition comprises a metallic flake based stop-leak composition. Particularly, in one embodiment, second stop-leak composition is an aluminum flake based stop-leak composition. In one embodiment, the second stop-leak composition is RSL/2 Radiator Stop Leak ® commercially available from Justice Brothers, Inc., Duarte, Calif., USA. In one embodiment, the second-stop leak composition is Wynn's radiator sealant, commercially available from Wynn Oil Company, Azusa, Calif., USA. Aluminum based stop-leak compositions work well for very small, pinhole type leaks. Particularly, aluminum based stop-leak compositions having aluminum particles ranging in size from micro-inch sized particles to approximately 0.033 inches.

For either type of stop-leak composition, the size of the polymer or metallic particles should be extremely small so they remain in solution and/or suspension. Special formulations in the sub-microinch scale would be preferable.

In other embodiments of the present invention, first and second stop-leak compositions are supplemented with a marker that is noticeable on the exterior of process transmitter 14 after a leak has been sealed. For example, a color additive or a scent additive can be used. In other embodiments, the stop-leak is supplemented with a chemical additive that is emitted into the air after a leak has been sealed. The chemical additive can then be detected using a chemical detector such as a mass spectrometer. Additionally, in other embodiments, the stop leak composition is supplemented with an ultraviolet light sensitive material, whereby after a leak has been sealed the ultraviolet sensitive material could be detected with ultraviolet light.

Although the present invention has been described with reference to preferred embodiments, workers skilled in the art will recognize that changes may be made in form and detail without departing from the spirit and scope of the invention.

The invention claimed is:

1. A self-sealing remote seal for use with a process transmitter having a first isolation diaphragm, the remote seal comprising:
   a capillary tube;
   a second isolation diaphragm at a first end of the capillary tube for contacting a process fluid;
   a coupler at a second end of the capillary tube for connecting the capillary tube with the first isolation diaphragm of the process transmitter; and
   a fill fluid in the capillary tube for relaying a change in the second isolation diaphragm to the first isolation diaphragm, the fill fluid comprising:
      a hydraulic fluid; and
      a stop-leak composition for sealing leaks in the remote seal.

2. The remote seal of claim 1 wherein the stop-leak composition is self-sealing.

3. The remote seal of claim 1 wherein the stop-leak composition is a metallic flake based composition.

4. The remote seal of claim 1 wherein the stop-leak composition is a polymer based composition.

5. The remote seal of claim 1 wherein the stop-leak composition includes an additive that is detectable from the exterior of the remote seal after a leak has been sealed by the stop-leak composition.

* * * * *

UNITED STATES PATENT AND TRADEMARK OFFICE
CERTIFICATE OF CORRECTION

| | | |
|---|---|---|
| PATENT NO. | : 7,430,917 B2 | Page 1 of 1 |
| APPLICATION NO. | : 11/401020 | |
| DATED | : October 7, 2008 | |
| INVENTOR(S) | : Robert Hedtke | |

It is certified that error appears in the above-identified patent and that said Letters Patent is hereby corrected as shown below:

Title Page item 75 under Inventor, delete "American", insert --America--

Title Page item 56 under Other Publications,
delete "Webpage, Stephen Companies,", insert --Webpage, Stepan Companies,--

Signed and Sealed this

Fifth Day of May, 2009

JOHN DOLL
*Acting Director of the United States Patent and Trademark Office*